United States Patent
Saber et al.

(10) Patent No.: US 11,425,751 B2
(45) Date of Patent: Aug. 23, 2022

(54) SYSTEM AND METHOD FOR COLLISION HANDLING WITH CROSS CARRIER SCHEDULING

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 62 days.

(21) Appl. No.: 17/119,637

(22) Filed: Dec. 11, 2020

(65) Prior Publication Data

US 2022/0015126 A1 Jan. 13, 2022

Related U.S. Application Data

(60) Provisional application No. 63/049,737, filed on Jul. 9, 2020.

(51) Int. Cl.
*H04W 72/14* (2009.01)
*H04W 72/12* (2009.01)
*H04W 72/04* (2009.01)

(52) U.S. Cl.
CPC ... *H04W 72/1289* (2013.01); *H04W 72/0453* (2013.01); *H04W 72/14* (2013.01)

(58) Field of Classification Search
CPC ...... H04W 72/04; H04W 72/12; H04W 72/14
See application file for complete search history.

(56) References Cited

U.S. PATENT DOCUMENTS

| 10,477,531 | B2 | 11/2019 | Seo et al. | |
|---|---|---|---|---|
| 2018/0279360 | A1* | 9/2018 | Park | H04L 5/0092 |
| 2019/0254009 | A1 | 8/2019 | Hwang et al. | |
| 2019/0297637 | A1 | 9/2019 | Liou et al. | |
| 2019/0297640 | A1 | 9/2019 | Liou et al. | |
| 2019/0313429 | A1 | 10/2019 | Cheng | |

(Continued)

OTHER PUBLICATIONS

Ericsson: "Multi-RAT Dual-Connectivity and Carrier Aggregation enhancements (LTE, NR)," 3GPP, RP-200779, Jun. 2020, 57 pages, Retrieved from the Internet: URL:https://ftp.3gpp.org/tsg_ran/TSG_RAN/TSGR_88e/Docs/RP-200779.zip.

(Continued)

*Primary Examiner* — Michael T Vu
(74) *Attorney, Agent, or Firm* — Lewis Roca Rothgerber Christie LLP

(57) ABSTRACT

A method for cross carrier scheduling can include: determining that a candidate DCI for a UE schedules a DG PDSCH that at least partially overlaps an SPS PDSCH for the UE, wherein the DCI is configured to be transmitted on a first CC having a first SCS, and the DG PDSCH is configured for transmission on a second CC having a second SCS different from the first SCS; determining a timing gap based on the smallest of the first SCS and the second SCS; determining that an available time between the scheduled SPS PDSCH and the DCI is equal to or greater than the timing gap; cancelling the SPS PDSCH responsive to determining that the available time between the scheduled SPS PDSCH and the DCI is equal to or greater than the timing gap; and transmitting the DCI to the UE.

20 Claims, 7 Drawing Sheets

(56) References Cited

U.S. PATENT DOCUMENTS

2020/0305209 A1* 9/2020 Hosseini ............. H04W 52/281
2021/0227563 A1* 7/2021 Xu ..................... H04W 72/042

OTHER PUBLICATIONS

Huawei et al.: "Discussion on NR CA for cross-carrier scheduling with different numerologies," 3GPP, R1-1901580, Feb. 2019, 15 pages, Retrieved from the Internet: URL:http://www.3gpp.org/ftp/tsg%5Fran/WG1%5FRL1/TSGR1%5F96/Docs/R1%2D1901580%2Ezip.

Moderator (LG Electronics): "Summary on maintenance of other aspects for URLLC/IIoT," 3GPP, R1-2004035, May 2020, 40 pages, Retrieved from the Internet: URL:https://ftp.3gpp.org/tsg_ran/WG1_RL1_TSGR1_101-e/Docs/R1-2004035.zip.

Nokia et al.: "Maintenance of Rel-16 URLLC/IIoT SPS enhancements," 3GPP, R1-2000407, Feb. 2020, 5 pages, Retrieved from the Internet: URL:https://ftp.3gpp.org/tsg_ran/WG1_RL1/TSGR1_100_e/Docs/R1-2000407.zip.

EPO Extended European Search Report dated Oct. 15, 2021, issued in corresponding European Patent Application No. 21167784.4 (12 pages).

* cited by examiner

SYSTEM AND METHOD FOR COLLISION HANDLING WITH CROSS CARRIER SCHEDULING

CROSS-REFERENCE TO RELATED APPLICATION(S)

This application claims priority to and the benefit of U.S. Provisional Patent Application No. 63/049,737, filed in the United States Patent and Trademark Office on Jul. 9, 2020, the entire disclosure of which is incorporated by reference herein.

FIELD

Certain embodiments described herein relate to systems and methods for processing semi-persistently scheduled or dynamically granted communications in cellular communications protocols that involve cross carrier scheduling (CCS).

BACKGROUND

In certain cellular communications protocols, such as those of the 3rd Generation Partnership Project (3GPP) Fifth Generation New Radio (5G-NR) specifications for cellular networks, downlink traffic from a network device or network system to user equipment (UE) (e.g., a smartphone, internet of things device, or other computing device or electronic device) is wirelessly transmitted in signals that include a physical downlink shared channel (PDSCH) which can be dynamically scheduled (dynamic grant or DG) or semi-persistently scheduled (SPS). In some implementations, an SPS PDSCH scheduled for transmission on certain resources (e.g., time and frequency resources) may be cancelled to allow transmission of a DG PDSCH on those resources.

SUMMARY

According to one embodiment of the present disclosure, a method for cross carrier scheduling includes: determining, by a network, that a candidate cross-carrier-scheduling DCI for a user equipment (UE) schedules a dynamic grant (DG) PDSCH that at least partially overlaps a scheduled semi-persistent scheduling (SPS) PDSCH for the UE, wherein the candidate DCI is configured to be transmitted on a first component carrier (CC) having a first subcarrier spacing (SCS), and the DG PDSCH is configured for transmission on a second CC having a second SCS different from the first SCS. The method further includes identifying, by the network, a smallest of the first SCS and the second SCS; determining, by the network, a timing gap based on the smallest of the first SCS and the second SCS; and determining, by the network, that an available time between the scheduled SPS PDSCH and the candidate DCI is equal to or greater than the timing gap. The method yet further includes cancelling, by the network, the SPS PDSCH responsive to determining that the available time between the scheduled SPS PDSCH and the candidate DCI is equal to or greater than the timing gap; and transmitting, by the network, the candidate DCI to the UE.

According to another embodiment of the present disclosure, a network device configured for cross carrier scheduling includes a processor and non-transitory processor-executable media storing instructions that, when executed by the processor, cause the processor to perform certain processes. The processes include: determining that a candidate cross-carrier-scheduling DCI for a UE schedules a DG PDSCH that at least partially overlaps a scheduled semi-persistent scheduling SPS PDSCH for the UE, wherein the candidate DCI is configured to be transmitted on a first CC having a first SCS, and the DG PDSCH is configured for transmission on a second CC having a second SCS different from the first SCS. The processes further includes identifying a smallest of the first SCS and the second SCS; determining a timing gap based on the smallest of the first SCS and the second SCS; and determining that an available time between the scheduled SPS PDSCH and the candidate DCI is equal to or greater than the timing gap. The processes yet further includes cancelling the SPS PDSCH responsive to determining that the available time between the scheduled SPS PDSCH and the candidate DCI is equal to or greater than the timing gap; and transmitting the candidate DCI to the UE.

According to another embodiment of the present disclosure, a method for cross carrier scheduling includes: determining, by a network, that a candidate cross-carrier-scheduling DCI for a UE schedules a dynamic grant DG PDSCH that at least partially overlaps an SPS PDSCH for the UE, wherein the candidate DCI is configured to be transmitted on a first CC having a first SCS, and the DG PDSCH is configured for transmission on a second CC having a second SCS different from the first SCS. The method further includes identifying, by the network, the first SCS and/or the second SCS; determining, by the network, a timing gap based on the first SCS and/or the second SCS; determining, by the network, that an available time between the scheduled SPS PDSCH and the candidate DCI is equal to or greater than the timing gap; cancelling, by the network, the SPS PDSCH responsive to determining that the available time between the scheduled SPS PDSCH and the candidate DCI is equal to or greater than the timing gap; and transmitting the candidate DCI to the UE.

BRIEF DESCRIPTION OF THE DRAWINGS

The accompanying drawings, together with the specification, illustrate certain example embodiments.

DETAILED DESCRIPTION

In the following detailed description, certain example embodiments are described by way of illustration. The present disclosure should not be construed as being strictly limited to the embodiments explicitly set forth herein.

In cellular communications, such as those comporting with standards and/or protocols included in 3GPP 5G NR technology for cellular networks, downlink traffic from a network device or a "gNode B" (gNB) to a UE (e.g., a smartphone, an internet of things device, or other communication device configured to communicate with a 5G network) is transmitted via physical downlink shared channels (PDSCHs). Such communications may be referred to herein simply as "PDSCH" or "PDSCHs". Certain logistics, scheduling, or control parameters for PDSCH, which may include specification of resources for the transmission (such as time resources and frequency resources that are reserved for the transmission) may be set, defined, or determined by communications sent via one or more physical downlink control channels (PDCCH). Such communications may be referred to herein simply as "PDCCH" or "PDCCHs".

Per certain 3GPP 5G protocols, a DG PDSCH is scheduled by a network device by transmitting, to a UE via a PDCCH, downlink control information (DCI). Per certain 3GPP 5G protocols, the DCI can be, for example, of format DCI 1_0 or DCI 1_1. The DCI includes, among other information, the time and frequency resources in which UE can be expected to receive the DG PDSCH. The UE may accordingly receive a PDSCH at the indicated time and frequencies.

Per certain 3GPP 5G protocols, an SPS PDSCH communication can be implemented, in via which it possible for the UE to receive one or more PDSCHs without a separate scheduling DCI for each PDSCH. For example, in SPS PDSCH communication, a network device may transmit to the UE a first SPS PDSCH scheduled by a PDCCH (which can be referred to as SPS PDSCH with PDCCH). This can be similar to scheduling of a DG PDSCH via PDCCH, in some ways. However, here the first PDCCH may specify that this is not just a DG PDSCH, but rather the first occasion of a series of SPS PDSCHs (this may be explicitly or implicitly specified). The UE may know the time and frequency resources of the subsequent SPS PDSCHs (known as SPS PDSCHs without PDCCH), according to a radio resource control (RRC) configuration of the first SPS PDSCH. Thus, the UE may be notified to expect and receive a plurality of PDSCHs, without needing a separate PDCCH for each separate PDSCH. The UE may continue to expect the scheduled (e.g., periodic) PDSCHs until another DCI is sent via PDCCH that ends the SPS.

Figure 1:
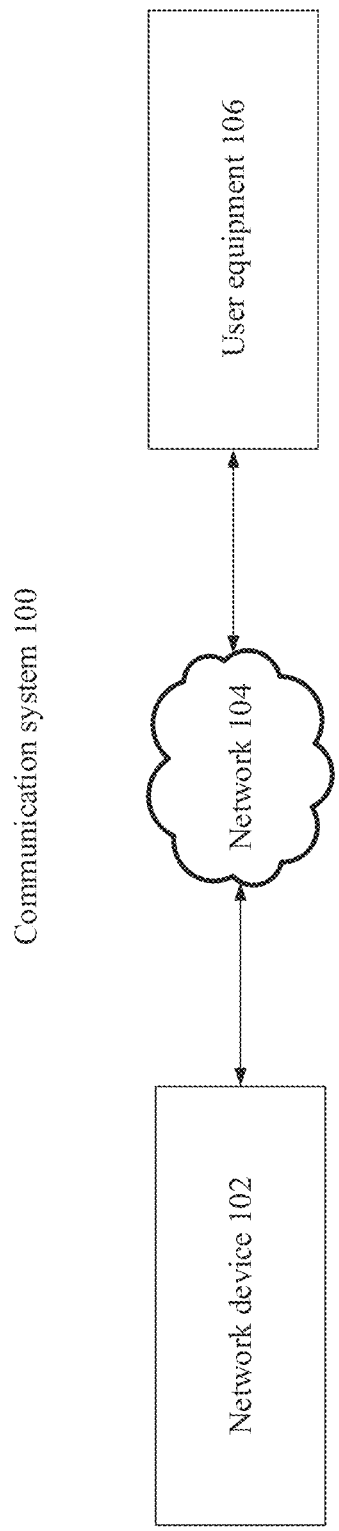
FIG. 1 shows an example communication system configured to provide communication between a network device and a UE, according to some embodiments.

FIG. 1 shows a communication system 100 that can be used for cellular communications (e.g., in accordance with an applicable 3GPP standard). The communication system 100 may include a network device 102, a network 104, and a UE 106. The techniques described herein may be implemented by the communication system 100 (or by one or more components thereof).

The network device may be a gNB device, and may be configured to schedule transmissions between the gNB and the UE, and to communicate with one or more other gNBs. The network device may be a 5G network device. Note that the term "network device" may be used herein to refer to a network system, and a network device is not limited to referring to a single physical device, but may also refer to plurality of distributed devices (or components thereof) that perform networking functions).

The network 104 may include, for example, a large area network (LAN), such as a cellular communication network. The UE 106 may include, for example, any device configured to communicate via the network 104 (e.g., a mobile device, a smartphone, a tablet, a desktop, a laptop, a local area network (LAN) device that serves local devices and that connects them the network 104, an internet of things device, or any other appropriate communication device). Note that the term UE is not necessarily limited to a device that is operated by a user, and may refer to devices that operate independent of user control.

Figure 2:
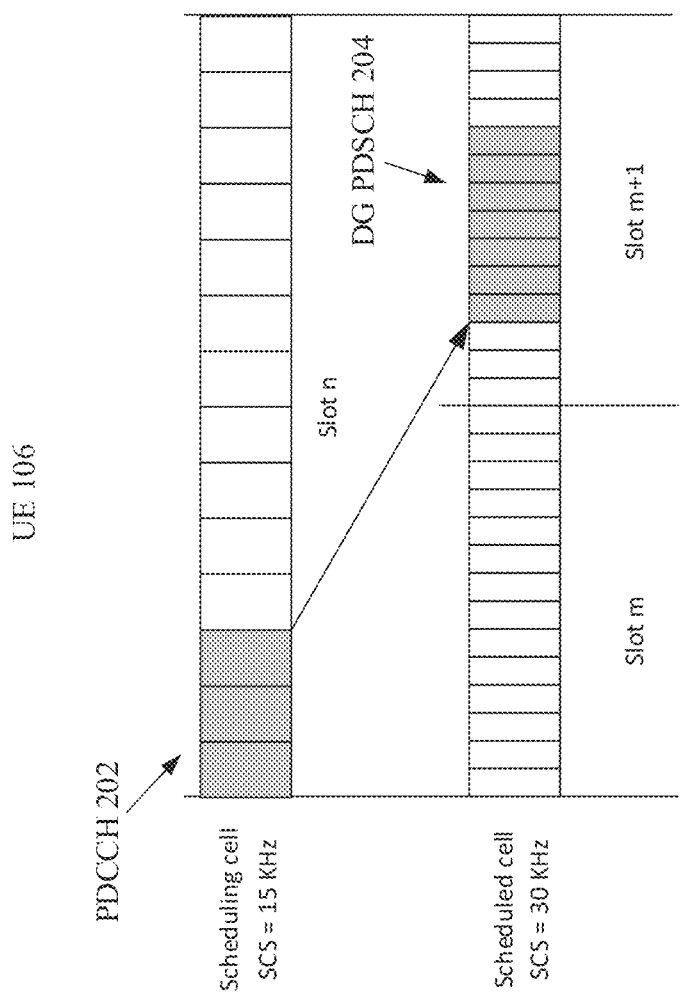
FIG. 2 shows an example of CCS by a UE, according to some embodiments.

FIG. 2 shows an example of CCS by a UE, according to some embodiments. The depicted CCS can be implemented by the UE 106. As depicted, the UE 106 can process communications in a first cell (referred to in this context as a "scheduling cell") and in a second cell (referred to in this context as a "scheduled cell"). The presently depicted example shows that the two cells have different sub-carrier spacings (SCS), where the scheduling cell has an SCS of 15 kilohertz (KHz) (and a numerology of $\mu=0$) and the scheduled cell has an SCS of 30 KHz (and a numerology of $\mu=1$). The 3GPP 5G standard defines certain numerologies $\mu$ that correspond to certain SCSs (including $\mu=0$ and SCS=15 kHz, $\mu=1$ and SCS=30 kHz, $\mu=2$ and SCS=60 kHz, =3 and SCS=120 kHz, $\mu=4$ and SCS=240 kHz), and the 3GPP 5G standard supports CCS between cells with different numerologies, as shown in FIG. 2.

FIG. 2 shows the UE 106 decoding a PDCCH 202 received in the first three symbols of a slot n of the scheduling cell. The PDCCH 202 includes a DCI (such as the DCI 302 shown in FIG. 3 and described in detail below) that schedules a DG PDSCH 204 in slot m+1 of the scheduled cell, and the UE 106 receives the DG PDSCH 204 as scheduled.

Such CCS can be useful for a variety of reasons. For example, the 5G frequency range 1 (FR1, 450 megahertz (MHz) to 6 gigahertz (GHz)) can be used to receive PDCCHs that schedule PDSCHs in the 5G frequency range 2 (FR2, 24.25 GHz to 52.6 GHz). Generally speaking, FR1 tends to have better coverage and it is more reliable than FR2, though communication via FR1 may be somewhat slower (in a data/second sense) than communication via FR2, and so it may be useful to use FR1 for PDCCH and to use FR2 for PDSCH. Cross-carrier scheduling involving using FR2 for PDCCH and FR1 for PDSCH is also supported in the 3GPP 5G standard.

One issue that may arise with CCS with different numerologies is that it may involve more buffering due to slow PDCCH decoding, because (generally speaking) PDCCH decoding of a PDCCH received on a smaller SCS cell (as shown in FIG. 2) takes a longer time than PDCCH decoding of a PDCCH received on a higher SCS cell, whereas in a self-scheduling scheme PDCCH processing may be implemented in the same higher SCS cell as the PDSCH. To mitigate this decoding issue, the 3GPP 5G specification implements a timing gap $\Delta$ between the end of receiving the last symbol of the PDCCH (which may be referred to herein as the "end of PDCCH") and the start of receiving the first symbol the PDSCH (which may be referred to herein as the "start of PDSCH"), such that the earliest possible start time of the PDSCH is $\Delta$ symbols from the end of the PDCCH. This allows additional time for decoding of the received PDCCH (which can, for example, start after the reception of the PDCCH). The following table shows the agreed $\Delta$ values in the 3GPP 5G specification at the time of filing the present disclosure:

TABLE 1

| Scheduling cell SCS | $\Delta$ (symbols of scheduling cell numerology) |
| --- | --- |
| 15 | 4 |
| 30 | 5 |

TABLE 1-continued

| Scheduling cell SCS | Δ (symbols of scheduling cell numerology) |
|---|---|
| 60 | 10 |
| 120 | 14 |

Note that the above takes into account the scheduling cell SCS, but ignores the scheduled cell SCS.

Thus, it can be important to account for the time required to decode a CCS scheduling PDCCH by implementing a suitable timing gap Δ.

Figure 3:
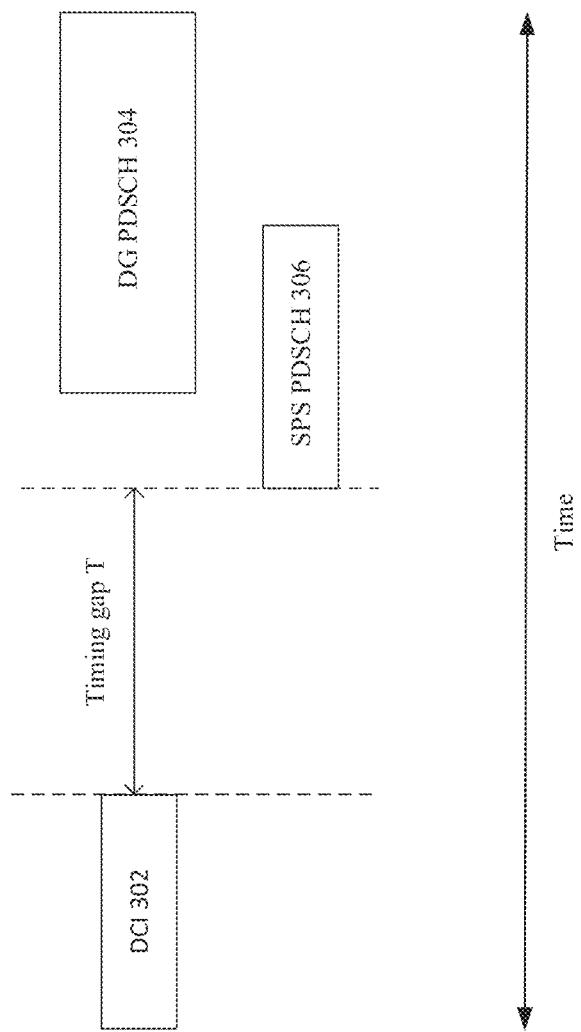
FIG. 3 shows an example of a schedule that involves a DG PDSCH and an SPS PDSCH, according to some embodiments.

Referring now to FIG. 3, FIG. 3 shows an example of a schedule 300 configured by the network device 102. Note that although FIG. 3 has a horizontal axis that represents time, the horizontal axis may also represent a number of symbols given a specified SCS (or, correspondingly, a specified numerology). Generally speaking, throughout the present disclosure, specifications or requirements regarding a timing or an amount of time may be interchangeable with specifications or requirements regarding a number of symbols and a corresponding SCS or numerology. In cases where the number of symbols or the SCS (or numerology) is known, predetermined, assumed, or already specified, then specifications or requirements regarding a timing or an amount of time may be interchangeable with just a specification or requirement of one of a number of symbols, an SCS, or a numerology. For example, if a given context involves a predetermined number of symbols, than a specification or requirement expressed as a timing requirement (e.g., the timing gap T, or the available time discussed in reference to FIG. 4 and other figures) can be interchangeable with a specification or requirement expressed as an SCS or numerology requirement. By way of further example, if a given context involves a predetermined SCS or numerology, than a specification or requirement expressed as a timing requirement (e.g., the timing gap T, or the available time discussed in reference to FIG. 4) can be interchangeable with a specification or requirement expressed as a number of symbols. Thus, for example, a "timing gap" or an "available time" can refer to a period of time, or to a number of symbols when an SCS or numerology is known, predetermined, assumed, or already specified, or to an SCS or numerology when a number of symbols is known, predetermined, assumed, or already specified, as will be apparent from the context.

The schedule 300 involves a DG PDSCH 304 and an SPS PDSCH 306, according to some embodiments. A DCI 302 schedules the DG PDSCH 304 (which can be, for example, similar to the DG PDSCH 204 described above), and the SPS PDSCH 306 in the depicted schedule was previously scheduled via ongoing SPS. The DCI 302 was received via a PDCCH, such as the PDCCH 202. FIG. 3 also depicts a timing gap T between the end of receiving the last symbol of the DCI 302 (which may be referred to herein as "the end the DCI 302") and the start of the SPS PDSCH, which is discussed in detail below.

The network device 102 may configure the schedule 300, and the network device 102 and the UE 106 may implement the schedule 300 (e.g., the network device 102 may transmit one or more communications according to the schedule, and the UE 106 may receive the communications according to the schedule). The network device 102 may configure the schedule 300 in such a way that the UE 106 is capable of managing the schedule (including capable of receiving communications using scheduled resources (including time and frequency resources), taking into account processing time requirements or specifications of the UE 106). The network device 102 may configure the schedule 300 according to the 3GPP 5G standard, and in some embodiments may configure the schedule 300 according to capabilities that the UE 106 indicates to the network device 102 (e.g., based on the UE 106 indicating a capability for CCS).

The schedule 300 shows a conflict or collision between the DG PDSCH 304 and the SPS PDSCH 306, because the DG PDSCH 304 and the SPS PDSCH 306 partially overlap. The conflict shown in schedule 300 can be resolved by the network device 102 cancelling the SPS PDSCH 306. Such cancellation can be implemented by the network device 102 sending the DCI 302 to the UE 106. The UE 106, upon reception of the DCI 302 that scheduled the DG PDSCH 304, will determine that the DG PDSCH 304 overlaps the SPS PDSCH 306 and will responsively cancel the SPS PDSCH 306 (thus, the DCI 302 can be said to implicitly contain instructions to cancel the SPS PDSCH 306). However, the UE 106 needs some time following reception of the DCI 302 to process the DCI 302, including decoding the DCI 302, determining that there is an overlap, and implementing the cancellation of the SPS PDSCH 306—this time is represented in FIG. 3 by the timing gap T. If the DCI 302 is received too close to the SPS PDSCH 306, the UE 106 might not process the cancellation of the SPS PDSCH 306 in advance of the start of the SPS PDSCH 306, and this might be problematic as the SPS PDSCH 306 might be partially processed and then cancelled (thereby wasting resources) or not cancelled at all (causing other complications with the delay or non-transmission of the DG PDSCH 304). To avoid such issues, the network 102 can assure that the DCI 302 is sent in time such that the UE 106 finishes receiving the DCI 302 at least the timing gap T in advance of the start of the SPS PDSCH 306. Note that the network 102 may know how long (e.g., may know a maximum possible time or a maximum reasonable time) the UE 106 takes to process the DCI 302 (e.g., because such a maximum such processing time is established in the 3GPP 5G standard, and/or because the DCI may indicate this to the network 102), and can assure that the DCI 302 is transmitted in time to be received by the start of the timing gap T.

Note that the term "assure" as used herein can refer to a guarantee, or can refer to a probability being equal to or greater than an acceptable threshold (e.g., a 95%+ probability, a 99%+ probability, a 99.9%+ probability, or greater).

The network 102 may thus, when performing a scheduling process, analyze the DCI 302 to determine whether it can be transmitted at least the timing gap T in advance of the start of the SPS PDSCH 306. If the network 102 determines that a candidate time for transmitting the DCI 302 is at least the timing gap T in advance of the start of the SPS PDSCH 306, then the network 102 may responsively determine to proceed with transmitting the DCI 302 (and thereby implicitly cancelling the SPS PDSCH 306). If the network 102 determines that a candidate time for transmitting the DCI 302 is not at least the timing gap T in advance of the start of the SPS PDSCH 306 (is too close to the start of the SPS PDSCH 306 to assure that the UE 106 can cancel the SPS PDSCH 306), then the network 102 may responsively determine NOT to proceed with transmitting the DCI 302 at the candidate time.

One technique for implementing the timing gap T is to use a fixed number of symbols (e.g., 14 symbols, which is the number of symbols in one slot, per the 3GPP 5G standard). 14 symbols, for example, may be suitable for self-scheduling (non-cross-carrier scheduling). However, in CCS involving cells having different SCSs, the technique can be improved by taking into account the different SCSs, such as by selecting a best SCS to use for the fixed number of symbols, and/or by selecting an optimized number of symbols based on the scheduling cell SCS, the scheduled cell SCS, or both.

Furthermore, the technique can be improved by establishing a schedule that assure that both (i) the CCS decoding requirements (which can be account for using the Δ timing gap) described above in reference to FIG. 2, and (ii) the SPS PDSCH cancellation processing requirements (such as determining that the SPS PDSCH and a candidate DG PDSCH overlap, and cancelling the SPS PDSCH) discussed immediately above in reference to FIG. 3 are accommodated by selection or determination of an appropriate timing gap T.

Figure 5:
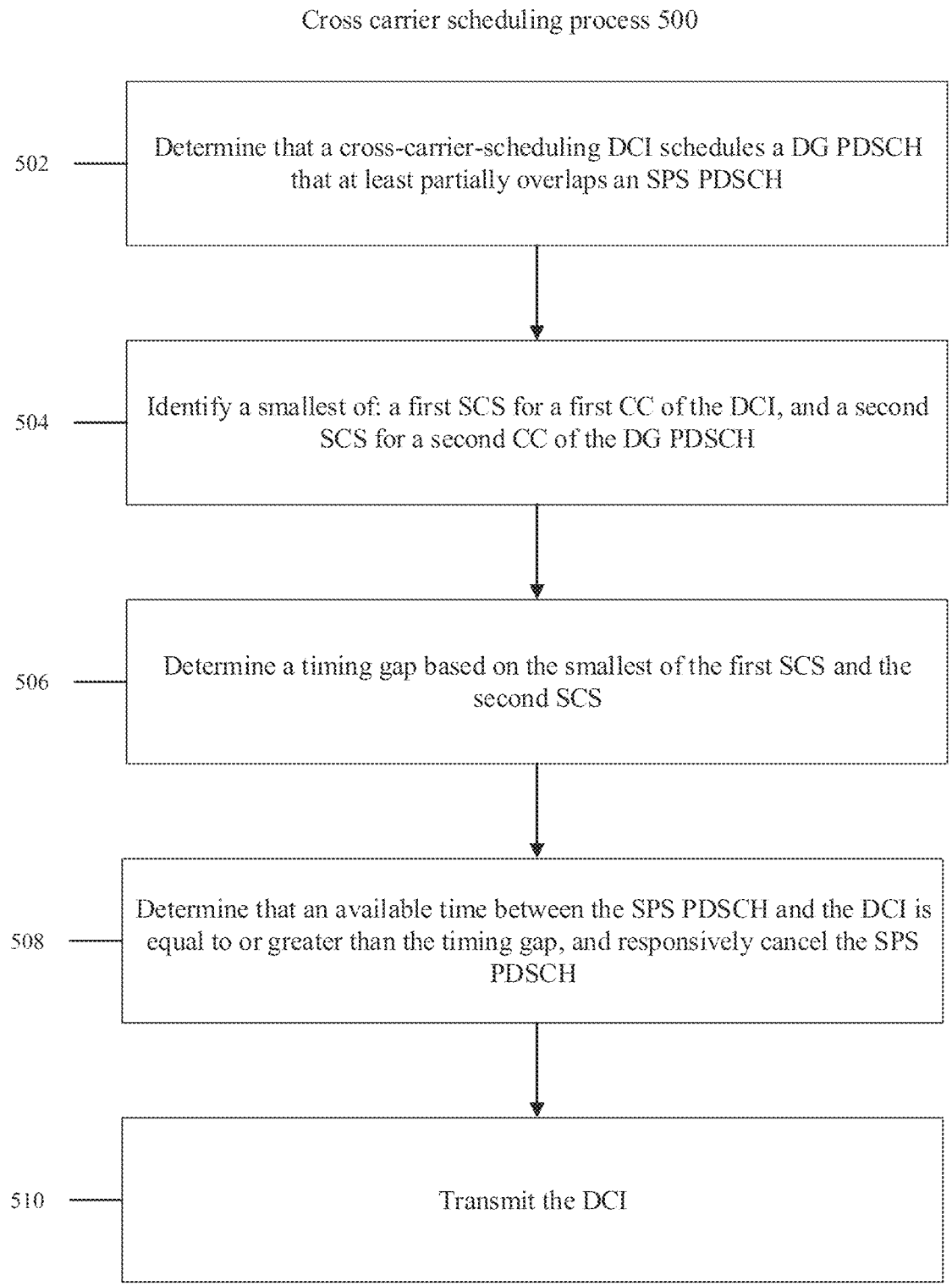
FIG. 5 shows an example of a CCS process, according to some embodiments.
Figure 6:
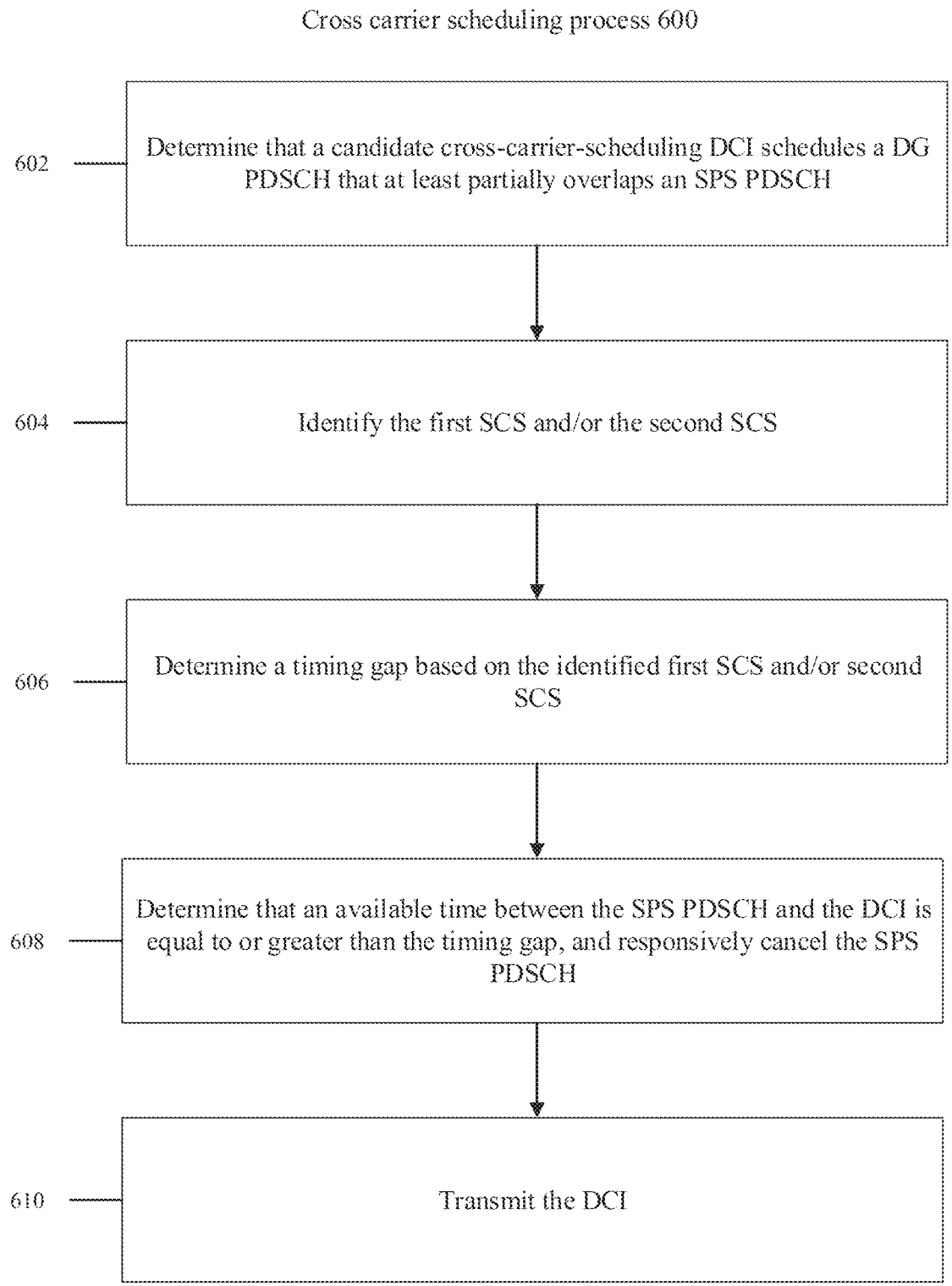
FIG. 6 shows another example of a CCS process, according to some embodiments.

Techniques that provide for improved scheduling and accommodating various timing requirements in CCS are described herein (e.g., in reference to FIGS. 5 and 6). With such improved techniques, the network and UE behavior is clearly defined for reception of SPS PDSCHs and DG PDSCHs in terms of how to assure that a schedule accommodates various timing requirements. Without such a behavior, UEs may receive DCIs that they are unable to accommodate because the DCIs did not arrive in time to cancel an SPS PDSCH, or SPS PDSCHs may have to be cancelled after processing of the SPS PDSCH has already begun, or different UEs may have different understandings with the network as to which DCIs they may be expected to accommodate, which can add complexity to the system and may impose burdensome requirements on the network devices and the UEs. The improved techniques discussed herein can help to avoid or mitigate such problems.

Note that although FIG. 3 shows a single SPS PDSCH overlapping with the candidate DG PDSCH 304, in some embodiments, more than one SPS PDSCH can overlap, and the conflict or collision resolution techniques described herein (including the protocol for cancelling overlapping SPS PDSCHs) can be applied to more than one SPS PDSCH. In such embodiments, the network device 102 may determine whether the candidate DCI 302 would be transmitted in time to cancel each of the overlapping SPS PDSCHs, in accordance with techniques described herein. If the network device 102 determines that at least one overlapping SPS PDSCH would not be assured to be cancelled in time, the network device 102 may responsively determine to not transmit the DCI 302, and to not implement the DG PDSCH 304. If the network device 102 determines that every overlapping SPS PDSCH would be assured to be cancelled in time, the network device 102 may responsively determine to transmit the DCI 302, and to thereby implicitly instruct cancelling of every overlapping SPS PDSCH. Furthermore, note that while the example shown in FIG. 3 involves an SPS PDSCH that starts before a start of the DG PDSCH, the techniques described herein are also applicable to a schedule that involves one or more SPS PDSCH that starts after a start of the DG PDSCH, and that overlaps with the DG PDSCH. In such a scenario, as in the scenario depicted in FIG. 3, the timing gap starts at the end of the DCI.

Figure 4:
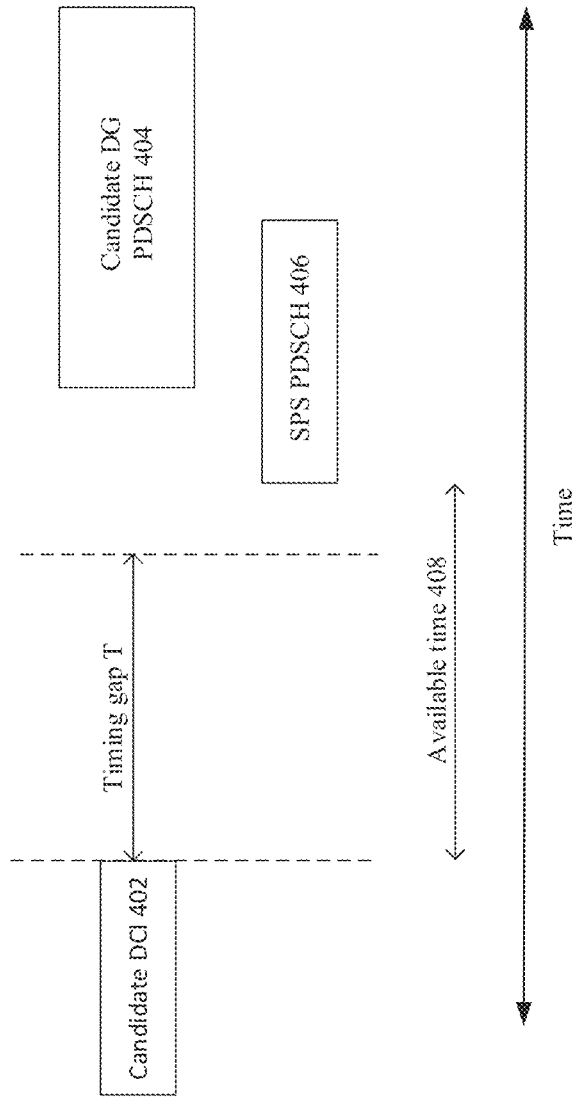
FIG. 4 shows an example of a proposed schedule that involves a DG PDSCH and an SPS PDSCH, according to some embodiments.

Referring now to FIG. 4, FIG. 4 shows a proposed schedule 400 that the network device 102 may analyze in a scheduling process. The proposed schedule 400 may include a candidate DCI 402 (which may be similar to the DCI 302), a candidate DG PDSCH 404 (which may be similar to the DG PDSCH 304), an SPS PDSCH 406 (which may be similar to the SPS PDSCH 306), and a timing gap T (which may be similar to the timing gap T shown in FIG. 3) that corresponds to a processing time for the UE to process the DCI 402 (including cancellation of the SPS PDSCH 406).

As used herein, a candidate DCI and a candidate DG PDSCH refer to a DCI and a PDSCH that a network device is attempting to schedule. A DCI and a DG PDSCH may also be referred to as a candidate DCI and a candidate DG PDSCH when a network device is determining whether the DCI and the PDSCH can be successfully scheduled.

The proposed schedule 400 also includes an available time 408 that span from an end of the candidate DCI 402 to a start of the SPS PDSCH 406 (note that in a scenario involving multiple overlapping SPS PDSCHs, the available time starts at the end of the DCI and ends at the start of the first SPS PDSCH of the multiple SPS PDSCHs). The available time 408 may correspond to an available time in which the UE can process the candidate DCI 402 (including decoding the candidate DCI 402 and cancelling the SPS PDSCH 406 (or the multiple SPS PDSCHs), if appropriate).

The network device 102 may analyze the candidate DCI 402 (received on a scheduling cell having a first SCS) that schedules the candidate DG PDSCH 404 (received on a scheduling cell having a second SCS that differs from the first SCS), and the network device 102 may determine whether the candidate DCI 402 can be transmitted given certain timing requirements or timing specifications, including whether the candidate DCI 402 would arrive in sufficient time for the receiving UE to process the candidate DCI 402. In some embodiments, the network device 102 may determine whether the available time 408 is at least as large as (is equal to or larger than) the timing gap T, and if so, the network device 102 may determine that the proposed schedule 400 is tenable, and may proceed with the proposed schedule 400. Certain details of such analysis are discussed herein.

Referring now to FIG. 5, FIG. 5 shows an example of a CCS process 500, according to some embodiments. The CCS process 500 may be applied to the proposed schedule 400. As a brief overview, the CCS process 500 involves using a fixed number of symbols for the timing gap T, and using a smallest SCS of the scheduling cell SCS and the scheduled cell SCS. The CCS process 500 includes determining that a CCS DCI schedules a DG PDSCH that at least partially overlaps at least one SPS PDSCH (502), identifying a smallest of a first SCS for a first CC of the DCI (e.g., an SCS of the scheduling cell) and a second SCS for a second CC of the DG PDSCH (e.g., an SCS of the scheduled cell) (504). The CCS process 500 further includes determining a timing gap T based on the smallest of the first SCS and the second SCS (506), determining that an available time between the SPS PDSCH and the DCI is equal to or greater than the timing gap T, and responsively cancelling the SPS PDSCH (508), and transmitting the DCI (510).

The following describes a detailed example of the operations of the CCS process 500. At (502), the network device 102 determines whether it is feasible to transmit the candidate CCS DCI 402, which schedules the candidate DG PDSCH 404. In the present example, the network device 102 determines that the candidate DG PDSCH 404 at least partially overlaps the SPS PDSCH 406, and proceeds to operation (504). In other embodiments, the network device 102 may determine that no SPS PDSCHs overlap the DG PDSCH, and the network device 102 may proceed with transmitting the candidate DCI 402. In yet other embodiments, the network device 102 determines that a plurality of SPS PDSCHs at least partially overlap the candidate DG PDSCH 404, and the network device 102 selects an SPS PDSCH that has an earliest start of the plurality of SPS PDSCHs, and proceeds with operations (504)-(510) using the selected SPS PDSCH, thus assuring that the timing gap T is sufficient to accommodate the earliest SPS PDSCH and, therefore, also the other later SPS PDSCHs.

At (504), the network device 102 identifies a smallest of an SCS of the scheduling cell and an SCS of the scheduled cell. The network device 102 may compare the SCS of the scheduling cell to the SCS of the scheduled cell, and may select the smallest SCS of the two SCSs. The network device 102 may, responsive to determining that one of the SCSs is the smallest possible SCS in the 3GPP 5G standard (e.g., 15 KHz), select the that SCS and omit evaluating the other SCS or comparing to the other SCS, as the network device 102 can assume that the other SCS cannot possibly be smaller than the smallest possible SCS in the 3GPP 5G standard (such a process constitutes an example implementation of the network device 102 identifying a smallest of an SCS of the scheduling cell and an SCS of the scheduled cell). In the present example, the two SCSs are different, but in embodiments in which the two SCSs are the same, the network device 102 may select either SCS.

At (506), the network device 102 may determine a timing gap T based on the identified smallest one of the first SCS and the second SCS (which may be referred to simply as the "smallest SCS"). The timing gap T can be a quantity of time corresponding to (e.g., equal to) a predetermined number of symbols (e.g., a number of symbols specified in the 3GPP 5G specification, such as 14 symbols) having the smallest of the first SCS and the second SCS (the smallest SCS), or can be an SCS value equal to the smallest SCS in a context where the number of symbols is specified (e.g., in the 3GPP 5G specification), such as 14 symbols, or can be a numerology corresponding to the smallest SCS in such a context.

As noted above, generally speaking, communications transmitted via smaller SCSs are more reliable, but slower to process (e.g., slower to decode), than communications transmitted via larger SCSs. Thus, by using the smallest of the SCSs (slower processing) when determining the timing gap T, the timing gap T is large enough to account for slow processing of the candidate DCI 402 by the UE 106.

At (508), the network 102 may determine that the available time 408 between the SPS PDSCH 406 and the candidate DCI 402 is equal to or greater than the timing gap T. Responsive to determining that the available time 408 between the SPS PDSCH 406 and the candidate DCI 402 is equal to or greater than the timing gap T, the network 102 may cancel the SPS PDSCH. Such cancellation can be implemented by the network device 102 sending the candidate DCI 402 to the UE 106. The UE 106, upon reception of the candidate DCI 402 that scheduled the candidate DG PDSCH 404, will determine that the candidate DG PDSCH 404 overlaps the SPS PDSCH 406 and will responsively cancel the SPS PDSCH 406 (thus, the candidate DCI 402 can be said to implicitly contain instructions to cancel the SPS PDSCH 406).

At (510), the network device 102 transmits the candidate DCI 402 to the UE 106. The network device 102, by virtue of the preceding operations, is assured that the candidate DCI 402 will be received by the UE 106 in time for the UE to process the candidate DCI 402 before the start of the SPS PDSCH 406, even given that the candidate DCI 402 may be received via a small SPS and may therefore take longer to process.

Generally speaking, without use of the CCS process 500, UEs may receive DCIs that they are unable to accommodate because the DCIs did not arrive in time to cancel an SPS PDSCH, or SPS PDSCHs may have to be cancelled after processing of the SPS PDSCH has already begun, or different UEs may have different understandings with the network as to which DCIs they may be expected to accommodate, which can add complexity to the system and may impose burdensome requirements on the network devices and the UEs. The CCS process 500 can help to avoid or mitigate these issues.

Referring now to FIG. 6, FIG. 6 shows another example of a CCS process 600, according to some embodiments. The CCS process 600 may be applied to the proposed schedule 400. As a brief overview, the CCS process 600 includes determining that a CCS DCI schedules a DG PDSCH that at least partially overlaps at least one SPS PDSCH (602), identifying a first SCS for a first CC of the DCI (e.g., an SCS of the scheduling cell) and/or a second SCS for a second CC of the DG PDSCH (e.g., an SCS of the scheduled cell) (604). The CCS process 600 further includes determining a timing gap T based on the identified first SCS and/or second SCS (606), determining that an available time between the SPS PDSCH and the DCI is equal to or greater than the timing gap, and responsively cancelling the SPS PDSCH (608), and transmitting the DCI (610).

The following will describe operations (604) and (606) in further detail in reference to an example embodiment. It is noted that operation (602) may be similar to or the same as operation (502) described above, operation (608) may be similar to or the same as operation (508) described above, and operation (610) may be similar to or the same as operation (510) described above.

At (604), the network device 102 may identify the first SCS and/or the second SCS, and at (606) the network device 102 may determine a timing gap T based on the identified first SCS and/or second SCS. Thus, the timing gap T can be determined to account for the first SCS and/or the second SCS, which can affect a processing time of the DCI, and thereby affect the desired timing gap T which allows sufficient time for the UE 106 to process the DCI. The following describes some example embodiments of such a process.

Embodiment 1: the network device 102 identifies the first SCS (scheduling cell SCS), and determines the timing gap T based on the first SCS. In one implementation, the timing gap T is determined as a predetermined number of symbols having the first SCS. The predetermined number of symbols may be a number specified by the 3GPP cellular 5G standard (e.g., 14 symbols). In another implementation, the UE 106 can indicate to the network device 102, as a capability, a certain number of symbols, and the timing gap T is determined as the certain number of symbols having the first SCS.

Embodiment 2: the network device 102 identifies the second SCS (scheduled cell SCS), and determines the timing gap T based on the first SCS. In one implementation, the timing gap T is determined as a predetermined number of symbols having the second SCS. The predetermined number of symbols may be a number specified by the 3GPP cellular 5G standard (e.g., 14 symbols). In another implementation, the UE 106 can indicate to the network device 102, as a capability, a certain number of symbols, and the timing gap T is determined as the certain number of symbols having the second SCS.

Embodiment 3: the network device 102 identifies the smallest of the first SCS and the second SCS (the "smallest SCS"), and determines the timing gap T based on the smallest SCS. This embodiment may be similar to the CCS process 500 shown in FIG. 5. In one implementation, the timing gap T is determined as a predetermined number of symbols based on the smallest SCS numerology. The predetermined number of symbols may be a number specified by the 3GPP cellular 5G standard (e.g., 14 symbols). In another implementation, the UE 106 can indicate to the network device 102, as a capability, a certain number of symbols, and the timing gap T is determined as the certain number of symbols having the smallest SCS.

Embodiment 4: the network device 102 identifies the both the first SCS and the second SCS, and determines the timing gap T based on both the first SCS and the second SCS. In one implementation, a specific number of symbols is specified for each possible SCS pair, as shown in the table below, where indicates a number of symbols to use for the timing gap T when the first SCS corresponds to numerology x and the second SCS corresponds to numerology y.

TABLE 2

| Scheduling Cell | Scheduled Cell SCS (KHz) | | | |
|---|---|---|---|---|
| SCS (KHz) | 15 | 30 | 60 | 120 |
| 15 | $A_{0,0}$ | $A_{0,1}$ | $A_{0,2}$ | $A_{0,3}$ |
| 30 | $A_{1,0}$ | $A_{1,1}$ | $A_{1,2}$ | $A_{1,3}$ |
| 60 | $A_{2,0}$ | $A_{2,1}$ | $A_{2,2}$ | $A_{2,3}$ |
| 120 | $A_{3,0}$ | $A_{3,1}$ | $A_{3,2}$ | $A_{3,3}$ |

The various $A_{x,y}$ values can be stored, for example, in a lookup table accessible to the network device 102. The various $A_{x,y}$ values can be specified in a cellular standard, such as the 3GPP 5G standard. In some implementations, the network device 102 determines the timing gap T as the number of symbols $A_{x,y}$ having the first SCS. In other implementations, the network device 102 determines the timing gap T as the number of symbols $A_{x,y}$ having the second SCS.

Embodiment 5: the network device 102 identifies at least the first SCS, and determines the timing gap T based on at least the first SCS. In one implementation, a specific number of symbols is specified for each possible SCS value, as shown in the table below, where $A_x$ indicates a number of symbols to use for the timing gap T when the first SCS corresponds to numerology x.

TABLE 3

| Scheduling Cell SCS (KHz) | Time gap (Number of OFDM symbols) |
|---|---|
| 15 | $A_0$ |
| 30 | $A_1$ |
| 60 | $A_2$ |
| 120 | $A_3$ |

The various $A_x$ values can be stored, for example, in a lookup table accessible to the network device 102. The various $A_x$ values can be specified in a cellular standard, such as the 3GPP 5G standard. In some implementations, the network device 102 determines the timing gap T as the number of symbols $A_x$ having the first SCS. In other implementations, the network device 102 determines the timing gap T as the number of symbols $A_x$ having the second SCS.

Embodiment 6: the network device 102 identifies the first SCS and/or the second SCS, and determines the timing gap T based on the first SCS and/or the second SCS. In one implementation, the timing gap T is determined as having a number of symbols equal to a predetermined number of symbols plus additional number of symbols (which may be referred to as an additional offset). The predetermined number of symbols can be specified in a cellular standard, such as the 3GPP 5G standard (e.g., can be 14 symbols). The additional number of symbols can specified (e.g., in a cellular standard, such as the 3GPP 5G standard) for either a given first SCS/second SCS pair (e.g., similarly to how the total number of symbols for the timing gap T is specified in table 2), or for a given first SCS (e.g., similarly to how the total number of symbols for the timing gap T is specified in table 3). Such values can be stored in a lookup table accessible to the network device 102. The timing gap T can be determined by the network device 102 as having a total number of symbols equal to the predetermined number of symbols plus the additional number of symbols, and the total number of symbols can have either the first SCS or the second SCS.

Embodiment 7A: applicable when $\mu_{scheduled}$ (numerology of the scheduled cell)>$\mu_{scheduling}$ (numerology of the scheduling cell), the network device 102 identifies the first and second SCS, and determines the timing gap T based on the first and second SCS. The network device 102 determined the number of symbols for the timing gap T to be equal to the lesser of (i) $14 \times 2^{\mu_{scheduled}-\mu_{scheduling}}$, and (ii) $14+\Delta \times 2^{\mu_{scheduled}-\mu_{scheduling}}$. Values for $\Delta$ can be set as appropriate, e.g., can be the PDCCH-to-PDSCH gap defined in Rel-16 of the 3GPP 5G standard for the case of CCS with different numerologies, or can be determined in a similar manner as the additional offset discussed in embodiment 6. The symbols of the timing gap T may have the first SCS.

Embodiment 7B: applicable when $\mu_{scheduled}$ (numerology of the scheduled cell)>$\mu_{scheduling}$ (numerology of the scheduling cell), the network device 102 identifies the first and second SCS, and determines the timing gap T based on the first and second SCS. The network device 102 determined the number of symbols for the timing gap T to be equal to the lesser of (i) $14 \times 2^{\mu_{scheduled}-\mu_{scheduling}}$ and (ii) $14+\Delta$. Values for $\Delta$ can be set as appropriate, e.g., can be determined in a similar manner as the additional offset discussed in embodiment 6 (e.g., via lookup tables). The symbols of the timing gap T may have the second SCS.

Embodiment 8: applicable when $\mu_{scheduled}<\mu_{scheduling}$, the network device 102 identifies the first and second SCS, and determines the timing gap T based on the first and second SCS. The network device 102 determines the timing gap T to be a predetermined number of symbols (e.g., a number of symbols specified in a cellular communication standard, such as the 3GPP 5G standard), such as 14 symbols, having the second SCS, plus an additional offset of symbols having the first SCS. The values for the additional offset can be determined in a similar manner as the additional offset discussed in embodiment 6.

One or more of the above embodiments can be used in implementing operations (604) and (606) of the CCS process 600.

Generally speaking, without use of the CCS process 600, UEs may receive DCIs that they are unable to accommodate because the DCIs did not arrive in time to cancel an SPS PDSCH, or SPS PDSCHs may have to be cancelled after processing of the SPS PDSCH has already begun, or different UEs may have different understandings with the network as to which DCIs they may be expected to accommodate, which can add complexity to the system and may impose burdensome requirements on the network devices and the UEs. The CCS process 600 can help to avoid or mitigate these issues.

Figure 7:
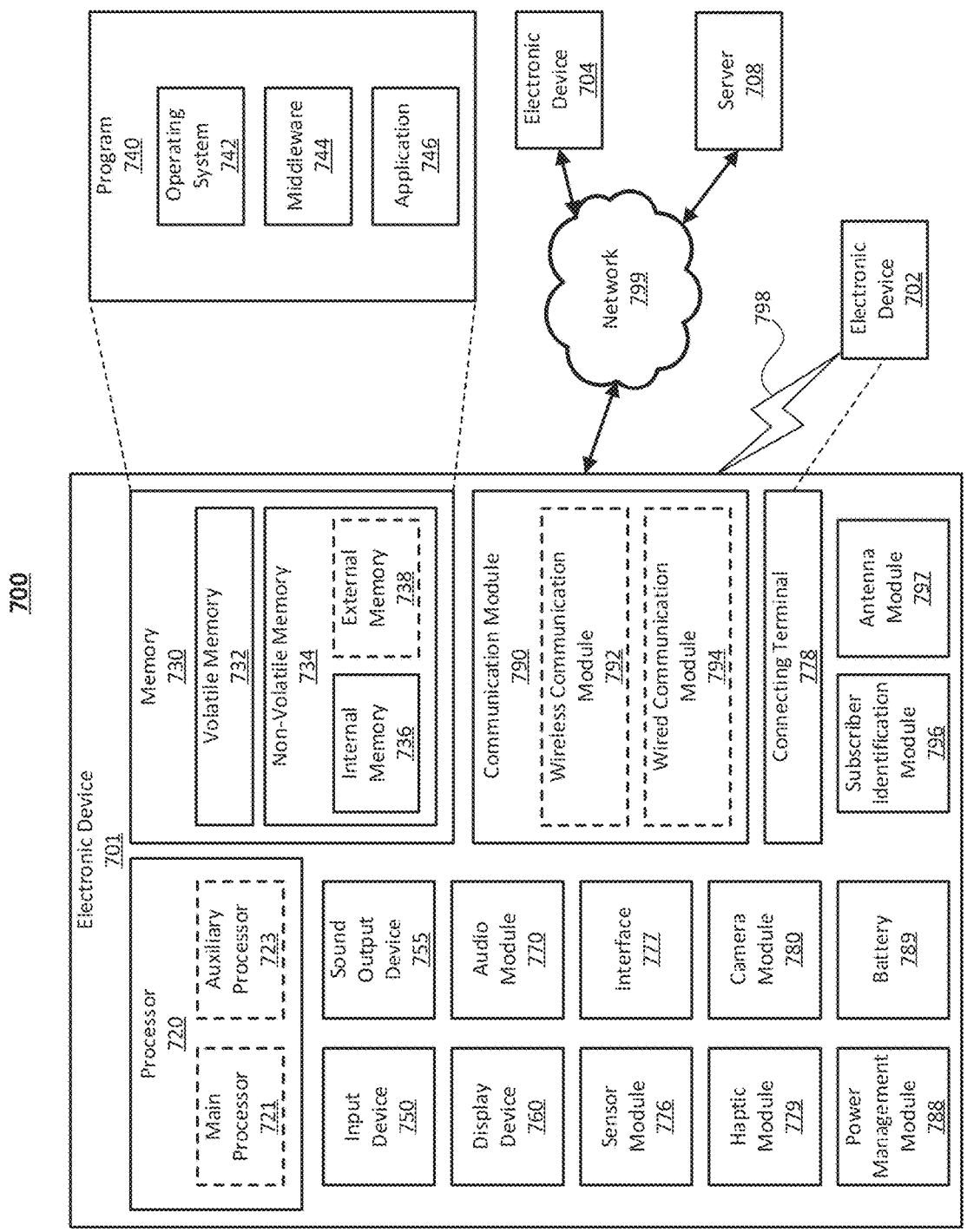
FIG. 7 shows an example of system configured for CCS, according to some embodiments.

FIG. 7 shows an example of a system 700 configured to implement CCS, according to some embodiments. Referring to FIG. 7, the electronic device 701 (which may be similar to, or the same as, the UE 106) in the network environment 700 may communicate with an electronic device 702 via a first network 798 (e.g., a short-range wireless communication network, such as a Wi-Fi network), or an electronic device 704 or a server 708 (which may be similar to, or the same as, the network device 102) via a second network 799 (which may be similar to, or the same as, the network 104), such as a long-range wireless communication network (e.g., a cellular communication network, such as a 5G network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, and/or an antenna module 797. In one embodiment, at least one of the components (e.g., the display device 760 or the camera module 780) may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display), or the display device 760 may include one or more sensors in addition to the sensor module 776.

In some embodiments, the device 701 may include a computing device or processor configured to implement cross carrier scheduling, such as the cross carrier scheduling process 500 shown in FIG. 5, or the cross carrier scheduling process 600 shown in FIG. 6.

The processor 720 may execute, for example, software (e.g., a program 740) to control at least one other component (e.g., a hardware or a software component) of the electronic device 701 coupled with the processor 720, and may perform various data processing and/or computations. As at least a part of the data processing and/or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, and/or execute a particular function. The auxiliary processor 723 may be implemented as being separate from, or as a part of, the main processor 721.

The auxiliary processor 723 may control at least some of the functions or states related to at least one component (e.g., the display device 760, the sensor module 776, or the communication module 790) from among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as a part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 and/or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, and/or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 760 may visually provide information to the outside (e.g., a user) of the electronic device 701. The display device 760 may include, for example, a display, a hologram device, and/or a projector and control circuitry to control a corresponding one of the display, the hologram device, and the projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, and/or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 and/or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, and/or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, and/or an audio connector (e.g., a headphone connector).

The haptic module 779 may convert an electrical signal into a mechanical stimulus (e.g., a vibration or a movement) and/or an electrical stimulus which may be recognized by a user via tactile sensation or kinesthetic sensation. According to one embodiment, the haptic module 779 may include, for example, a motor, a piezoelectric element, and/or an electrical stimulator.

The camera module 780 may capture a still image or moving images. According to one embodiment, the camera module 780 may include one or more lenses, image sensors, image signal processors, and/or flashes.

The power management module 788 may manage power supplied to the electronic device 701. The power management module 788 may be implemented as at least a part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, and/or a fuel cell.

The communication module 790 may support establishing a direct (e.g., wired) communication channel or a wireless communication channel between the electronic device 701 and the external electronic device (e.g., the electronic device 702, the electronic device 704, and/or the server 708) and performing communication via the established communication channel. The communication module 790 may include one or more communication processors that are operable independently from the processor 720 (e.g., the AP) and may support a direct (e.g., wired) communication and/or a wireless communication. According to one embodiment, the communication module 790 may include a wireless communication module 792 (e.g., a cellular communication module, a short-range wireless communication module, and/or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth®, wireless-fidelity (Wi-Fi) direct, and/or a standard of the Infrared Data Association (IrDA)) or the second network 799 (e.g., a long-range communication network, such as a cellular network, the Internet, and/or a computer network (e.g., LAN or wide area network (WAN)). Bluetooth® is a registered trademark of Bluetooth SIG, Inc., Kirkland, Wash. These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit and/or receive a signal and/or power to and/or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 and/or the second network 799, may be selected, for example, by the communication module 790 (e.g., the wireless communication module 792). The signal and/or the power may then be transmitted and/or received between the communication module 790 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 701 and the external electronic device 704 via the server 708 coupled with the second network 799. Each of the electronic devices 702 and 704 may be a device of a same type as, or a different type from, the electronic device 701. All or some of operations to be executed at or by the electronic device 701 may be executed at one or more of the external electronic devices 702, 704, or 708. For example, if the electronic device 701 should perform a function and/or a service automatically, or in response to a request from a user or another device, the electronic device 701, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 701. The electronic device 701 may provide the outcome, with or without further processing of the outcome, as at least a part of a reply to the request. To that end, a cloud computing, distributed computing, and/or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Herein, embodiments of the present disclosure are described in detail with reference to the accompanying drawings. It should be noted that same or similar elements may be designated by the same reference numerals/letters even though they are shown in different drawings. In the description herein, specific details such as detailed configurations and components are provided to assist with the overall understanding of the embodiments of the present disclosure. Various changes and modifications of the embodiments described herein may be made without departing from the scope of the present disclosure. Certain detailed descriptions may be omitted for clarity and conciseness.

The present disclosure provides for various modifications and various embodiments. It should be understood that the present disclosure is not limited to the various embodiments explicitly described or detailed herein, and that the present disclosure includes modifications, equivalents, and alternatives within the scope of the present disclosure.

Although terms including an ordinal number such as first, second, etc., may be used for describing various elements, the elements are not restricted by such terms. Such terms are used to distinguish one element from another element, and do not imply any specific ordering. As used herein, the term "and/or" includes any and all combinations of one or more associated items. Singular forms are intended to include plural forms unless the context clearly indicates otherwise. In the present disclosure, it should be understood that the terms "include" or "have" indicate the existence of a feature, a number, a step, an operation, a structural element, a part, or a combination thereof, and do not exclude the existence or probability of the addition of one or more other features, numbers, steps, operations, structural elements, parts, or combinations thereof.

According to one embodiment, at least one component (e.g., a manager, a set of processor-executable instructions, a program, or a module) of the above-described components may include a single entity or multiple entities. One or more of the above-described components may be omitted, or one or more other components may be added. Alternatively or additionally, a plurality of components (e.g., a manager, a set of processor-executable instructions, a program, or a module) may be integrated into a single component. In this case, the integrated component may still perform one or more functions of each of the plurality of components in the same or similar manner as they are performed by a corresponding one of the plurality of components before the integration. Operations performed by the manager, the set of processor-executable instructions, the program, the module, or another component may be carried out sequentially, in parallel, repeatedly, or heuristically, or one or more of the operations may be executed in a different order or omitted, or one or more other operations may be added.

While certain references are made herein to the 3GPP 5G specification, the techniques disclosed herein can be applied to or extended to other specifications, including cellular specifications (whether 3GPP or otherwise), such as the 3GPP 4G or LTE specification, any cellular specification that follows 5G (e.g., a 6G specification).

What is claimed is:

1. A method for cross carrier scheduling, comprising:
    determining, by a network, that a candidate cross-carrier-scheduling downlink control information (DCI) for a user equipment (UE) schedules a dynamic grant (DG) physical data shared channel (PDSCH) that at least partially overlaps a scheduled semi-persistent scheduling (SPS) PDSCH for the UE, wherein the candidate DCI is configured to be transmitted on a first component carrier (CC) having a first subcarrier spacing (SCS), and the DG PDSCH is configured for transmission on a second CC having a second SCS different from the first SCS;
    identifying, by the network, a smallest of the first SCS and the second SCS;
    determining, by the network, a timing gap based on the smallest of the first SCS and the second SCS;
    determining, by the network, that an available time between the scheduled SPS PDSCH and the candidate DCI is equal to or greater than the timing gap;
    cancelling, by the network, the SPS PDSCH responsive to determining that the available time between the scheduled SPS PDSCH and the candidate DCI is equal to or greater than the timing gap; and
    transmitting, by the network, the candidate DCI to the UE.

2. The method of claim 1, wherein determining the timing gap comprises determining a specified number of symbols having the smallest of the first SCS and the second SCS.

3. The method of claim 2, wherein the specified number of symbols is a pre-determined number of symbols specified by a cellular standard.

4. The method of claim 2, further comprising receiving, by the network from the UE, an indication of the UE's capability of implementing the specified number of symbols.

5. The method of claim 2, further comprising:
    determining, by the network device, that each of a plurality of scheduled SPS PDSCHs that include the scheduled SPS PDSCH at least partially overlap the DG PDSCH;
    determining, by the network device, that the scheduled SPS PDSCH has an earliest start of the plurality of SPS PDSCHs; and
    selecting, by the network device, the scheduled SPS PDSCH for analysis that includes the determining that the available time between the scheduled SPS PDSCH and the candidate DCI is equal to or greater than the timing gap.

6. A network device configured for cross carrier scheduling, comprising:
    a processor; and
    non-transitory processor-executable media storing instructions that, when executed by the processor, cause the processor to:
    determine that a candidate cross-carrier-scheduling downlink control information (DCI) for a user equipment (UE) schedules a dynamic grant (DG) physical data shared channel (PDSCH) that at least partially overlaps a scheduled semi-persistent scheduling (SPS) PDSCH for the UE, wherein the candidate DCI is configured to be transmitted on a first component carrier (CC) having a first subcarrier spacing (SCS), and the DG PDSCH is configured for transmission on a second CC having a second SCS different from the first SCS;
    identify a smallest of the first SCS and the second SCS;
    determine a timing gap based on the smallest of the first SCS and the second SCS;
    determine that an available time between the scheduled SPS PDSCH and the candidate DCI is equal to or greater than the timing gap;

cancel the SPS PDSCH responsive to determining that the available time between the scheduled SPS PDSCH and the candidate DCI is equal to or greater than the timing gap; and transmit the candidate DCI to the UE.

7. The device of claim 6, wherein determining the timing gap comprises determining a specified number of symbols having the smallest of the first SCS and the second SCS.

8. The device of claim 7, wherein the specified number of symbols is a pre-determined number of symbols specified by a cellular standard.

9. The device of claim 7, wherein the instructions, when executed by the processor, further cause the processor to process an indication of the UE's capability of implementing the specified number of symbols, wherein the indication of the UE's capability is received from the UE.

10. The device of claim 7, wherein the instructions, when executed by the processor, further cause the processor to:
determine that each of a plurality of scheduled SPS PDSCHs that include the scheduled SPS PDSCH at least partially overlap the DG PDSCH;
determine that the scheduled SPS PDSCH has an earliest start of the plurality of SPS PDSCHs; and
select the scheduled SPS PDSCH for analysis that includes the determining that the available time between the scheduled SPS PDSCH and the candidate DCI is equal to or greater than the timing gap.

11. A method for cross carrier scheduling, comprising:
determining, by a network, that a candidate cross-carrier-scheduling downlink control information (DCI) for a user equipment (UE) schedules a dynamic grant (DG) physical data shared channel (PDSCH) that at least partially overlaps a scheduled semi-persistent scheduling (SPS) PDSCH for the UE, wherein the candidate DCI is configured to be transmitted on a first component carrier (CC) having a first subcarrier spacing (SCS), and the DG PDSCH is configured for transmission on a second CC having a second SCS different from the first SCS;
identifying, by the network, the first SCS and/or the second SCS;
determining, by the network, a timing gap based on the first SCS and/or the second SCS;
determining, by the network, that an available time between the scheduled SPS PDSCH and the candidate DCI is equal to or greater than the timing gap;
cancelling, by the network, the SPS PDSCH responsive to determining that the available time between the scheduled SPS PDSCH and the candidate DCI is equal to or greater than the timing gap; and
transmitting the candidate DCI to the UE.

12. The method of claim 11, further comprising selecting, by the network, a smallest of the first SCS and the second SCS, wherein the timing gap is determined by the network based on a number of symbols having the selected one of the first SCS and the second SCS.

13. The method of claim 11, wherein the timing gap is determined by the network based on a number of symbols having the first SCS.

14. The method of claim 11, wherein the timing gap is determined by the network based on a number of symbols having the second SCS.

15. The method of claim 11, further comprising determining, by the network, a number of symbols based on both the first SCS and the second SCS, wherein the timing gap is determined by the network based on the number of symbols having the first SCS or the second SCS.

16. The method of claim 11, further comprising determining, by the network, a number of symbols based on the first SCS, wherein the timing gap is determined by the network based on the number of symbols having the first SCS or the second SCS.

17. The method of claim 16, further comprising determining, by the network, an extra offset based on the first SCS and/or the second SCS, wherein the timing gap is determined by the network based on a number of symbols used by a cellular communication standard for non-cross-carrier scheduling plus the extra offset.

18. The method of claim 11, wherein the network determines the reference value to be equal to a minimum of: (14 symbols$\times 2^{\mu_{scheduled}-\mu_{scheduling}}$) and (14 symbols+$\Delta$),
wherein $\Delta$ is an extra offset based on the first SCS and/or the second SCS, $\mu_{scheduled}$ is a numerology corresponding to the second SCS, and $\mu_{scheduling}$ is a numerology corresponding to the first SCS.

19. The method of claim 11, wherein the network determines the reference value to be equal to a minimum of: (14 symbols$\times 2^{\mu_{scheduled}-\mu_{scheduling}}$) and (14 symbols+$\Delta \times 2^{\mu_{scheduled}-\mu_{scheduling}}$),
wherein $\Delta$ is an extra offset based on the first SCS and/or the second SCS, $\mu_{scheduled}$ is a numerology corresponding to the second SCS, and $\mu_{scheduling}$ is a numerology corresponding to the first SCS.

20. The method of claim 11, further comprising receiving, by the network from the UE, an indication of the UE's timing capability for cross carrier scheduling, wherein the network determines the timing gap further based on the indication of the UE's timing capability for cross carrier scheduling.

* * * * *